US012634985B2

(12) United States Patent
Zhu

(10) Patent No.: US 12,634,985 B2
(45) Date of Patent: May 19, 2026

(54) METHOD FOR DETERMINING OCCUPANCY DURATION AND ELECTRONIC DEVICE

(71) Applicant: XIAOMI COMMUNICATIONS CO., LTD., Beijing (CN)

(72) Inventor: Yajun Zhu, Beijing (CN)

(73) Assignee: XIAOMI COMMUNICATIONS CO., LTD., Beijing (CN)

(*) Notice: Subject to any disclaimer, the term of this patent is extended or adjusted under 35 U.S.C. 154(b) by 589 days.

(21) Appl. No.: 17/774,688

(22) PCT Filed: Nov. 8, 2019

(86) PCT No.: PCT/CN2019/116587
§ 371 (c)(1),
(2) Date: May 5, 2022

(87) PCT Pub. No.: WO2021/087952
PCT Pub. Date: May 14, 2021

(65) Prior Publication Data
US 2022/0400515 A1      Dec. 15, 2022

(51) Int. Cl.
*H04W 74/0808*      (2024.01)
*H04L 5/00*      (2006.01)
(Continued)

(52) U.S. Cl.
CPC ....... *H04W 74/0808* (2013.01); *H04L 5/0094* (2013.01); *H04W 72/20* (2023.01); *H04W 74/002* (2013.01); *H04W 16/14* (2013.01)

(58) Field of Classification Search
CPC ............. H04W 74/0808; H04W 72/20; H04W 74/002; H04W 16/14; H04L 5/0094
See application file for complete search history.

(56) References Cited

U.S. PATENT DOCUMENTS

2020/0053728 A1*   2/2020   Huang ................ H04L 27/2601
2020/0314901 A1*   10/2020   Bhattad ................. H04W 72/12
(Continued)

FOREIGN PATENT DOCUMENTS

KR       20190117254 A   * 10/2019

OTHER PUBLICATIONS

Park Dong Hyun, "Method and Apparatus for Transmitting and Receiving Signal in New Radio System for Unlicensed Band", KR 20190117254 A English translation, Oct. 16, 2019 (Year: 2019).*
(Continued)

*Primary Examiner* — Thinh D Tran
(74) *Attorney, Agent, or Firm* — Cozen O'Connor

(57)      ABSTRACT

A method for determining an occupancy duration, includes receiving, on an unlicensed frequency band, public control information sent by a base station, the public control information including time domain unit format indication information and channel occupancy time indication information; determining a first occupancy duration of the base station with respect to the unlicensed frequency band according to the time domain unit format indication information, and determining a second occupancy duration of the base station with respect to the unlicensed frequency band according to the channel occupancy time indication information; and in responding to the first occupancy duration and the second occupancy duration being different from each other and overlapping, determining, according to the second occupancy duration, a duration for the base station to occupy the unlicensed frequency band.

12 Claims, 10 Drawing Sheets

(51) Int. Cl.
    *H04W 72/20*       (2023.01)
    *H04W 74/00*       (2009.01)
    *H04W 16/14*       (2009.01)

(56) References Cited

U.S. PATENT DOCUMENTS

2020/0351942 A1 *  11/2020  Jia ...................... H04W 74/0808
2022/0150917 A1 *  5/2022  Wang ................... H04W 16/14

OTHER PUBLICATIONS

Fujitsu, "On DL signals and channels for NR-U", R1-1904586, 3GPP TSG RAN WG1 #96bis Xi'an, China, Apr. 8-12, 2019 (Year: 2019).*
European Patent Application No. 19951591.7, Search and Opinion dated Jun. 28, 2023, 7 pages.
PCT/CN2019/116587 International Search Report, dated Jul. 30, 2020, 2 pages.
Nokia et al.; "On DL signals and channels"; 3GPP TSG RAN WG1 Meeting #96bis R1-1904193; Apr. 2019; 12 pages.
Intel Corporation; "DL Signals and Channels for NR-unlicensed"; 3GPP TSG RAN WG1 Meeting #96bis R1-1904283; Apr. 2019; 5 pages.

* cited by examiner

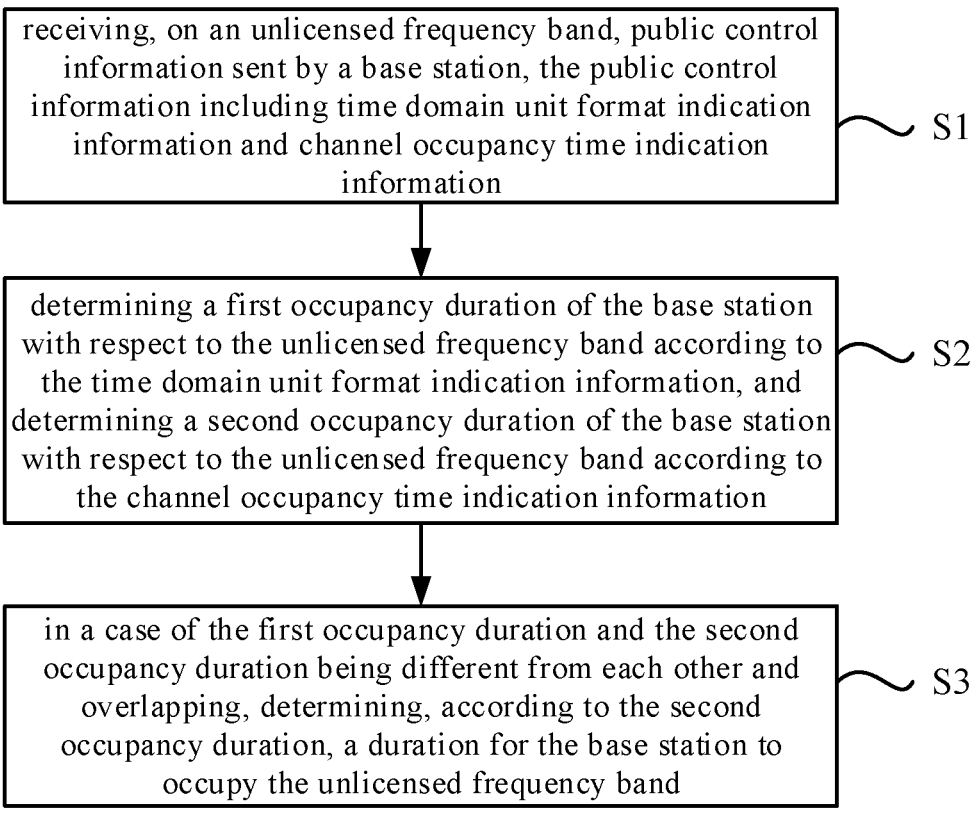

receiving, on an unlicensed frequency band, public control information sent by a base station, the public control information including time domain unit format indication information and channel occupancy time indication information ~ S1 determining a first occupancy duration of the base station with respect to the unlicensed frequency band according to the time domain unit format indication information, and determining a second occupancy duration of the base station with respect to the unlicensed frequency band according to the channel occupancy time indication information ~ S2 in a case of the first occupancy duration and the second occupancy duration being different from each other and overlapping, determining, according to the second occupancy duration, a duration for the base station to occupy the unlicensed frequency band ~ S3

FIG. 1

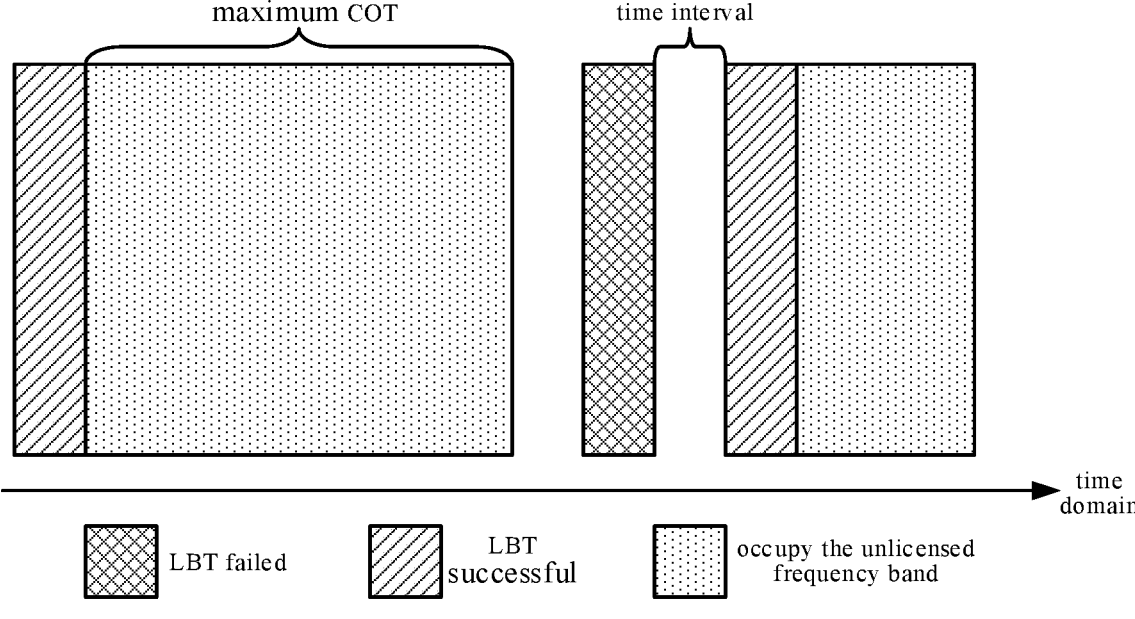

maximum COT          time interval

LBT failed

LBT successful occupy the unlicensed frequency band time domain

FIG. 2

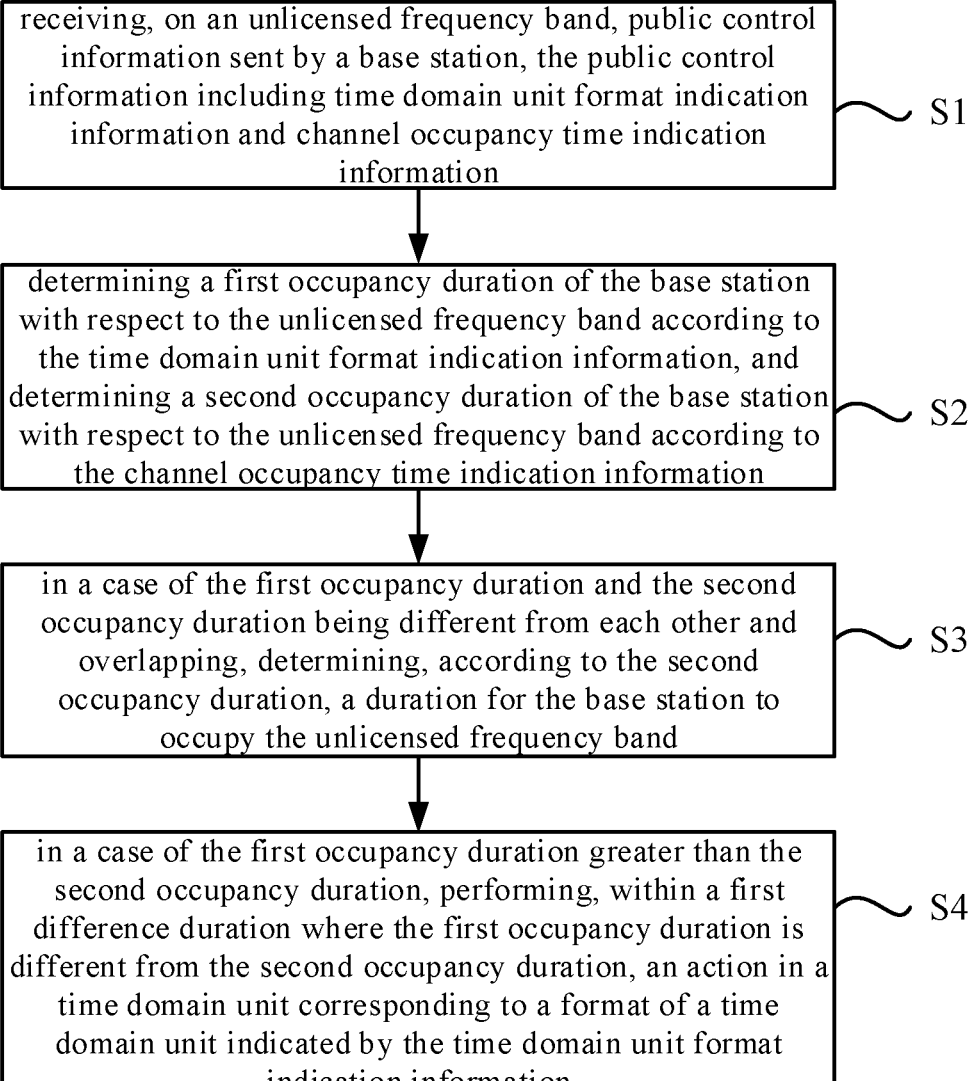

receiving, on an unlicensed frequency band, public control
information sent by a base station, the public control
information including time domain unit format indication
information and channel occupancy time indication
information
~ S1 determining a first occupancy duration of the base station
with respect to the unlicensed frequency band according to
the time domain unit format indication information, and
determining a second occupancy duration of the base station
with respect to the unlicensed frequency band according to
the channel occupancy time indication information
~ S2 in a case of the first occupancy duration and the second
occupancy duration being different from each other and
overlapping, determining, according to the second
occupancy duration, a duration for the base station to
occupy the unlicensed frequency band
~ S3 in a case of the first occupancy duration greater than the
second occupancy duration, performing, within a first
difference duration where the first occupancy duration is
different from the second occupancy duration, an action in a
time domain unit corresponding to a format of a time
domain unit indicated by the time domain unit format
indication information
~ S4

FIG. 4 receiving, on an unlicensed frequency band, public control information sent by a base station, the public control information including time domain unit format indication information and channel occupancy time indication information ~ S1 determining a first occupancy duration of the base station with respect to the unlicensed frequency band according to the time domain unit format indication information, and determining a second occupancy duration of the base station with respect to the unlicensed frequency band according to the channel occupancy time indication information ~ S2 in a case of the first occupancy duration and the second occupancy duration being different from each other and overlapping, determining, according to the second occupancy duration, a duration for the base station to occupy the unlicensed frequency band ~ S3 in a case of the second occupancy duration greater than the first occupancy duration, detecting, within a second time difference where the second occupancy duration is different from the first occupancy duration, the unlicensed frequency band, and sending information to the based station through the unlicensed frequency band in a case of the unlicensed frequency band being idle ~ S5

FIG. 6

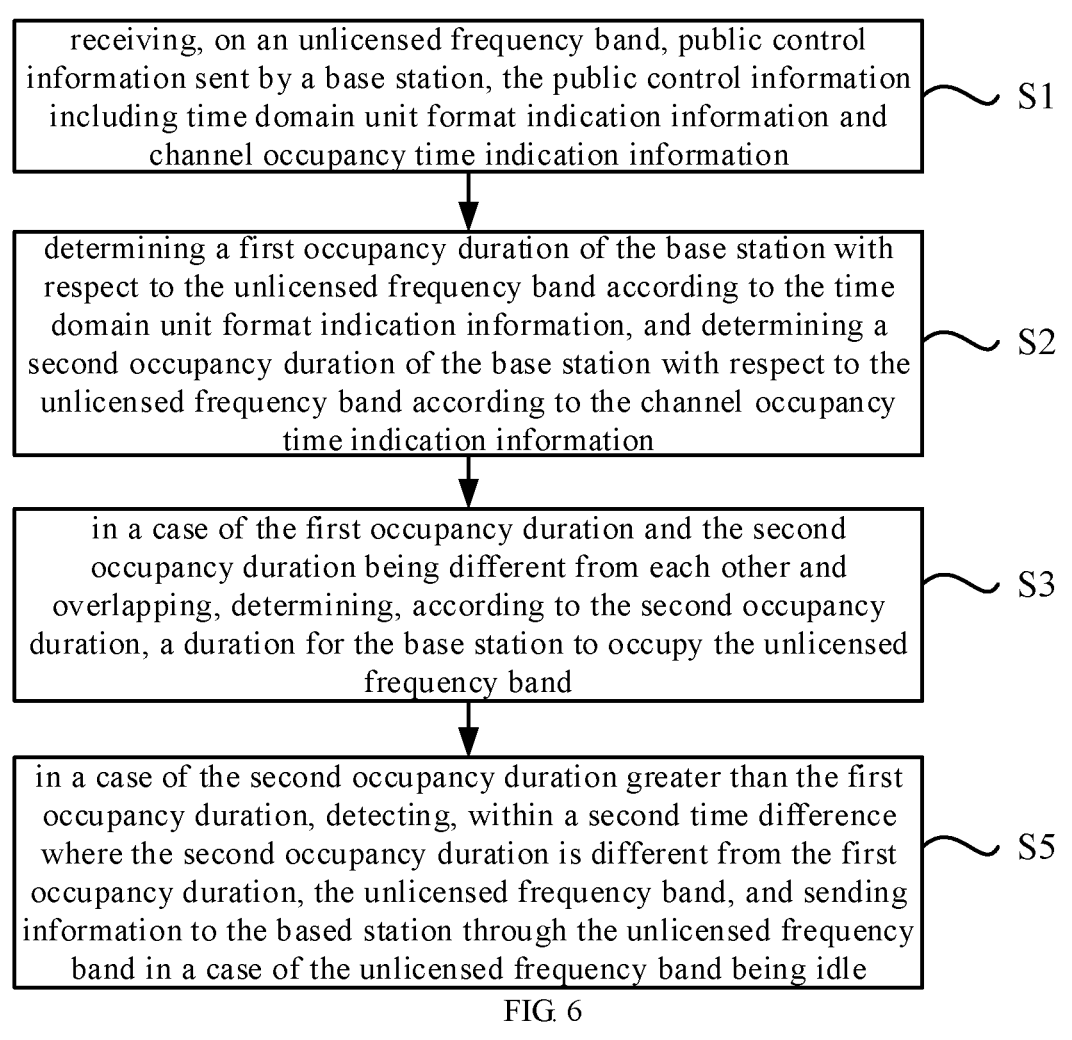

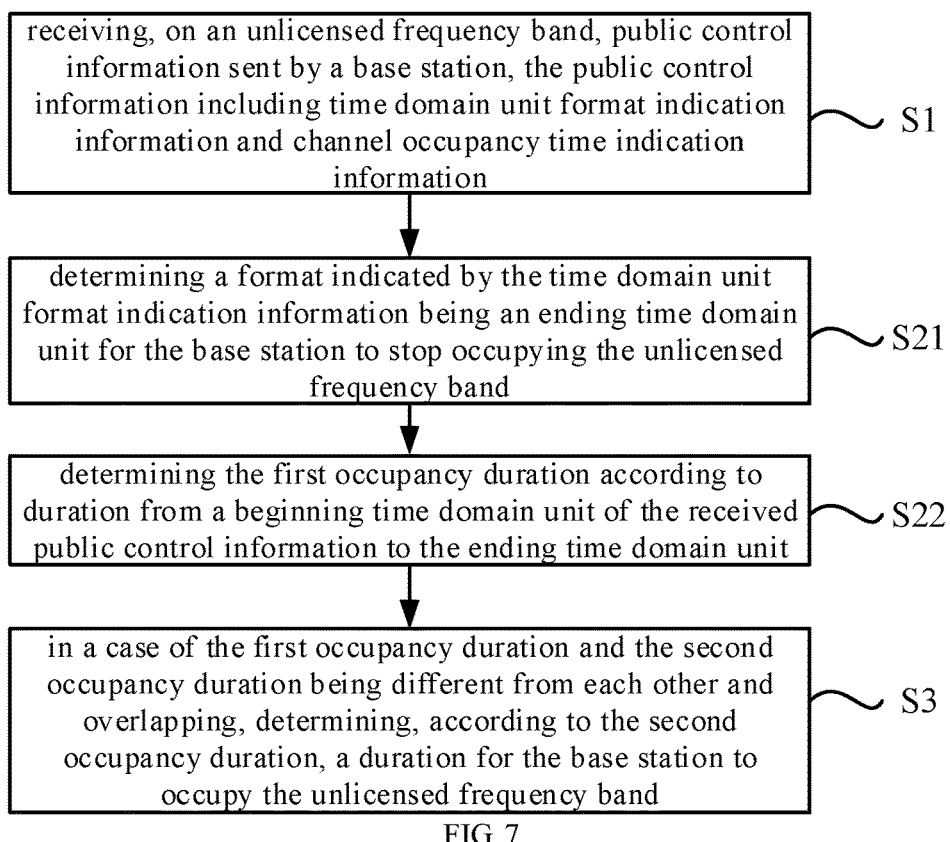

receiving, on an unlicensed frequency band, public control information sent by a base station, the public control information including time domain unit format indication information and channel occupancy time indication information ～ S1 determining a format indicated by the time domain unit format indication information being an ending time domain unit for the base station to stop occupying the unlicensed frequency band ～ S21 determining the first occupancy duration according to duration from a beginning time domain unit of the received public control information to the ending time domain unit ～ S22 in a case of the first occupancy duration and the second occupancy duration being different from each other and overlapping, determining, according to the second occupancy duration, a duration for the base station to occupy the unlicensed frequency band ～ S3

FIG. 7

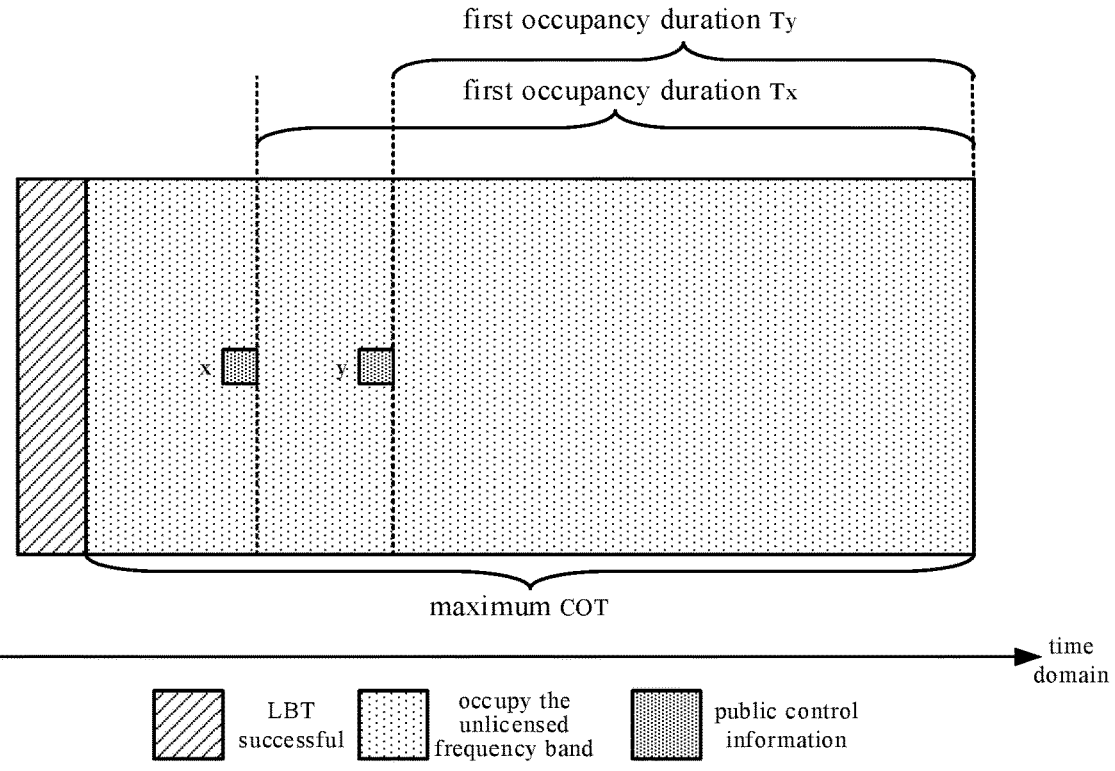

first occupancy duration Ty first occupancy duration Tx maximum COT time domain

LBT successful     occupy the unlicensed frequency band     public control information

FIG. 8

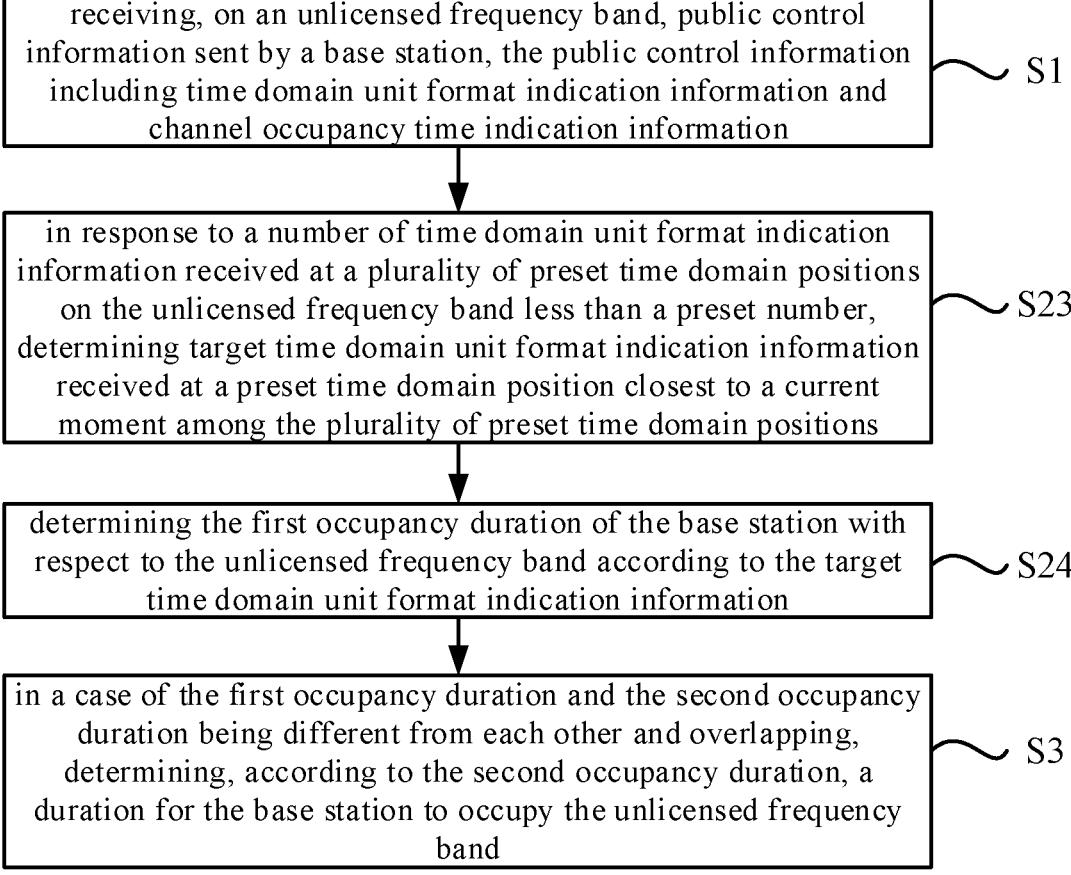

receiving, on an unlicensed frequency band, public control information sent by a base station, the public control information including time domain unit format indication information and channel occupancy time indication information     ~ S1 in response to a number of time domain unit format indication information received at a plurality of preset time domain positions on the unlicensed frequency band less than a preset number, determining target time domain unit format indication information received at a preset time domain position closest to a current moment among the plurality of preset time domain positions     ~ S23 determining the first occupancy duration of the base station with respect to the unlicensed frequency band according to the target time domain unit format indication information     ~ S24 in a case of the first occupancy duration and the second occupancy duration being different from each other and overlapping, determining, according to the second occupancy duration, a duration for the base station to occupy the unlicensed frequency band     ~ S3

FIG. 9

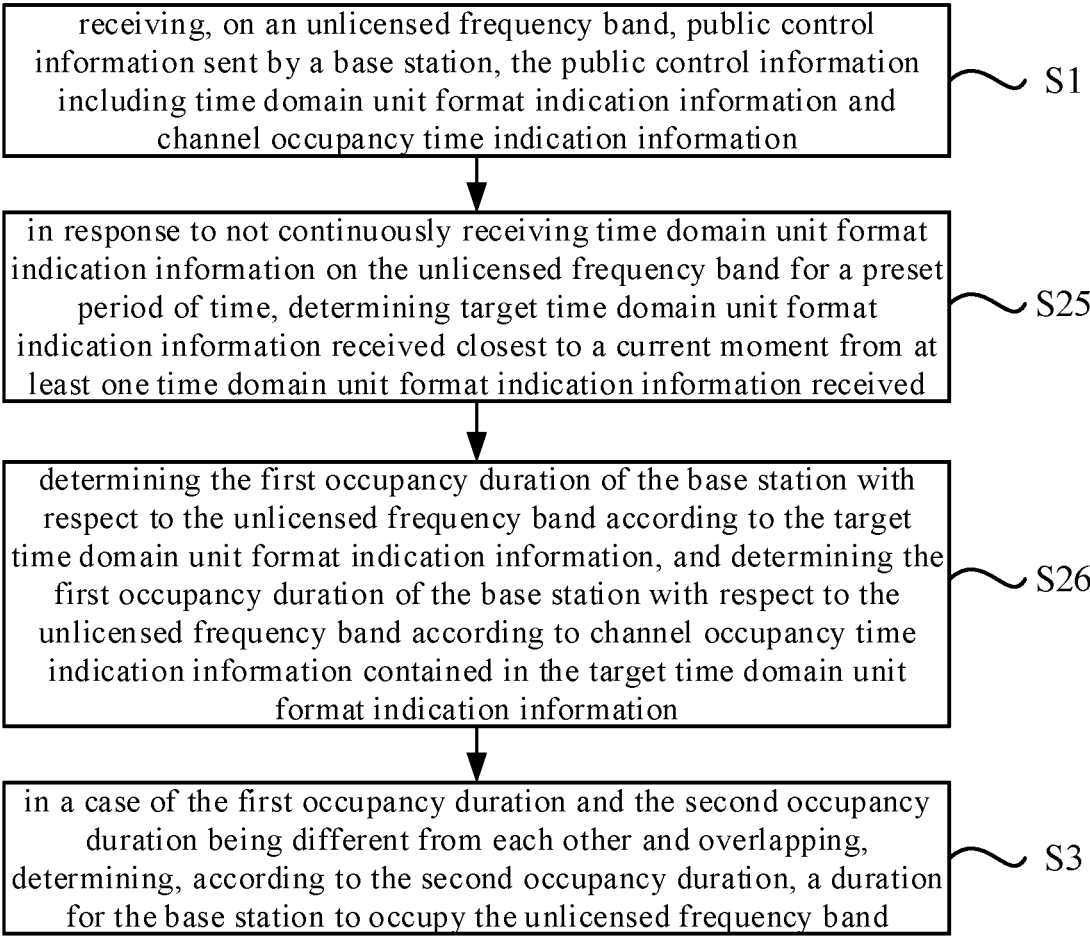

receiving, on an unlicensed frequency band, public control information sent by a base station, the public control information including time domain unit format indication information and channel occupancy time indication information ~ S1 in response to not continuously receiving time domain unit format indication information on the unlicensed frequency band for a preset period of time, determining target time domain unit format indication information received closest to a current moment from at least one time domain unit format indication information received ~ S25 determining the first occupancy duration of the base station with respect to the unlicensed frequency band according to the target time domain unit format indication information, and determining the first occupancy duration of the base station with respect to the unlicensed frequency band according to channel occupancy time indication information contained in the target time domain unit format indication information ~ S26 in a case of the first occupancy duration and the second occupancy duration being different from each other and overlapping, determining, according to the second occupancy duration, a duration for the base station to occupy the unlicensed frequency band ~ S3

FIG. 10

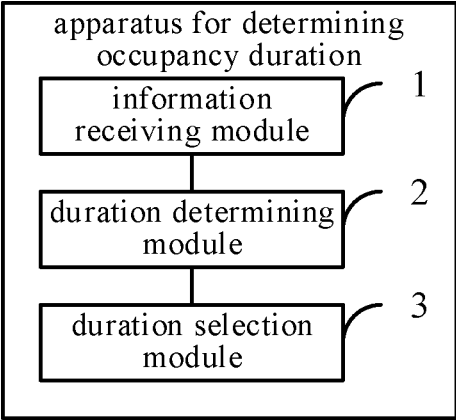

apparatus for determining occupancy duration information receiving module 1 duration determining module 2 duration selection module 3

FIG. 11

METHOD FOR DETERMINING OCCUPANCY DURATION AND ELECTRONIC DEVICE

CROSS-REFERENCE TO RELATED APPLICATION

The present application is a U.S. national stage of International Application No. PCT/CN2019/116587, filed on Nov. 8, 2019, the contents of which are incorporated herein by reference in their entireties for all purposes.

TECHNICAL FIELD

The present disclosure relates to the field of communication technology, in particular, relates to a method for determining occupancy of an unlicensed frequency band, an apparatus for determining an occupancy duration, and an electronic device.

BACKGROUND

With the development of communication technology, the licensed frequency bands have been difficult to meet the needs of communication between the terminal and the base station. For example, in the 5G communication system, the communication between the base station and the terminal may to be extended to the unlicensed frequency band. However, before using the unlicensed frequency band, it is necessary to detect the unlicensed frequency band to determine the state of the unlicensed frequency band. When the unlicensed frequency band is in an idle state, the unlicensed frequency band can be used for communication.

However, the base station does not occupy an idle unlicensed frequency band permanently. The base station determines an occupancy duration, which can be called channel occupancy time (COT for short), and the base station occupies the idle unlicensed frequency band during this occupancy duration.

SUMMARY

According to a first aspect of the disclosure, a method for determining an occupancy duration is provided. The method is performed by a terminal. The method includes:

receiving, on an unlicensed frequency band, public control information sent by a base station, the public control information including time domain unit format indication information and channel occupancy time indication information;

determining a first occupancy duration of the base station with respect to the unlicensed frequency band according to the time domain unit format indication information, and determining a second occupancy duration of the base station with respect to the unlicensed frequency band according to the channel occupancy time indication information; and in responding to the first occupancy duration and the second occupancy duration being different from each other and overlapping, determining, according to the second occupancy duration, a duration for the base station to occupy the unlicensed frequency band.

According to a second aspect of the disclosure, an electronic device is provided. The electronic device includes:

a processor; and a memory configured to store instruction executable by the processor.

The processor is configured to implement the method for determining an occupancy duration according to any of the above embodiments.

BRIEF DESCRIPTION OF THE DRAWINGS

In order to explain the technical solutions in embodiments of the present disclosure more clearly, the drawings described in the embodiments will be briefly introduced below. Obviously, the drawings described below are only some embodiments of the present disclosure. Those skilled in the art may obtain other drawings from these drawings without creative work.

FIG. 1 is a flow chart illustrating a method for determining an occupancy duration according to an embodiment of the disclosure;

FIG. 2 is a schematic diagram illustrating a base station occupying an unlicensed frequency band according to an embodiment of the disclosure;

FIG. 4 is a flow chart illustrating a method for determining an occupancy duration according to another embodiment of the disclosure;

FIG. 6 is a flow chart illustrating a method for determining an occupancy duration according to another embodiment of the disclosure;

FIG. 7 is a flow chart illustrating a method for determining an occupancy duration according to another embodiment of the disclosure;

FIG. 8 is a schematic diagram illustrating a base station sending a plurality of time domain unit format indication information according to an embodiment of the disclosure;

FIG. 9 is a flow chart illustrating a method for determining an occupancy duration according to another embodiment of the disclosure;

FIG. 10 is a flow chart illustrating a method for determining an occupancy duration according to another embodiment of the disclosure;

FIG. 11 is a block diagram illustrating an apparatus for determining an occupancy duration according to an embodiment of the disclosure;

DETAILED DESCRIPTION

Figure 3:
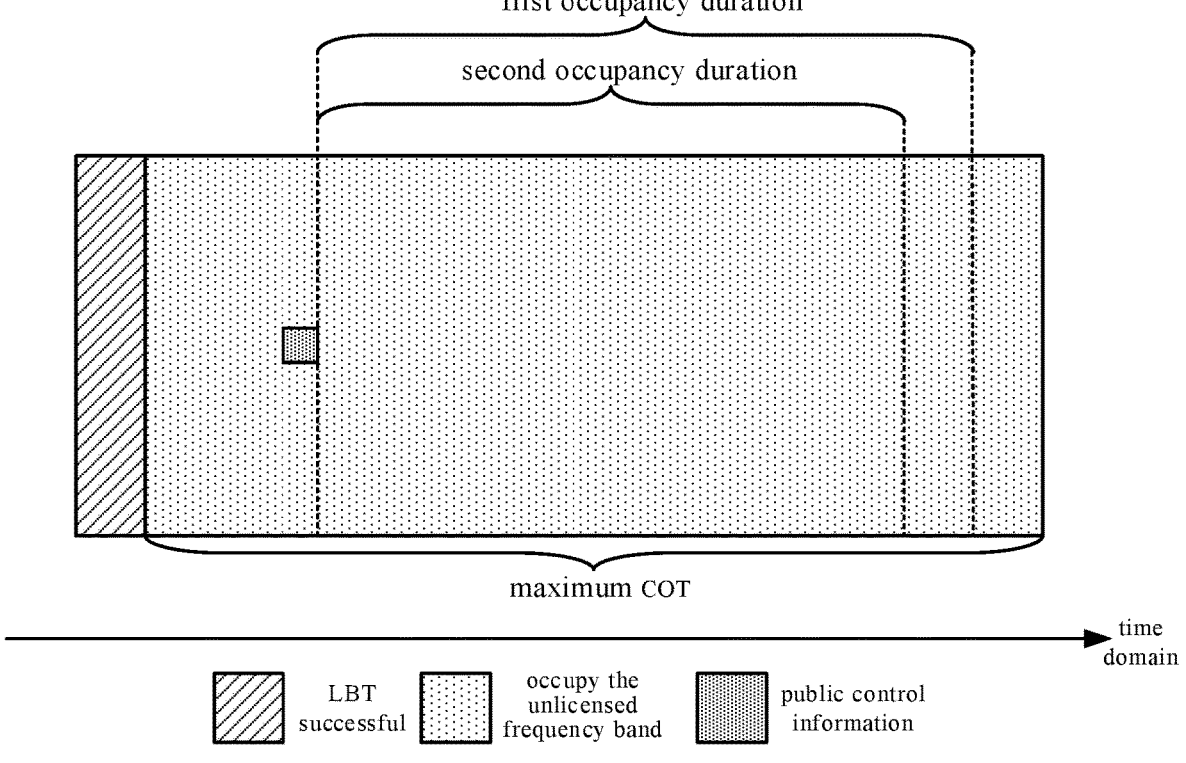
FIG. 3 is a schematic diagram illustrating a first occupancy duration and a second occupancy duration according to an embodiment of the disclosure.

The technical solutions in the embodiments of the disclosure will be clearly and completely described below with reference to the accompanying drawings in the embodiments of the disclosure. Obviously, the described embodiments are only a part of the embodiments of the disclosure, rather than all the embodiments. Based on the embodiments in the disclosure, all other embodiments obtained by those skilled in the art without creative efforts shall fall within the protection scope of the disclosure.

At present, there are mainly two ways for the terminal to determine the occupancy duration. One is to determine the occupancy duration according to a slot format indicated by the slot format indicator (SFI) in the public control information sent by the base station. The other one is to determine the occupancy duration according to an occupancy time indication information in the public control information. However, the occupancy durations determined by the terminal according to the above two methods may be different, which makes it difficult for the terminal to determine in time which occupancy duration is used as the duration for the base station to occupy the unlicensed frequency band.

FIG. 1 is a flow chart illustrating a method for determining an occupancy duration according to an embodiment of the disclosure. The method for determining an occupancy duration illustrated in embodiments of the disclosure may be performed by a terminal. The terminal includes, but is not limited to, a mobile phone, a tablet computer, a wearable device and the like. The terminal may communicate with a base station. For example, the terminal may communicate with the base station based on 4G protocols, and may also communicate with the base station based on 5G protocols.

As illustrated in FIG. 1, the method for determining an occupancy duration may include the following steps S1 to S3.

In step S1, public control information sent by a base station is received on an unlicensed frequency band. The public control information comprises time domain unit format indication information and channel occupancy time indication information.

In step S2, a first occupancy duration of the base station with respect to the unlicensed frequency band is determined according to the time domain unit format indication information, and a second occupancy duration of the base station with respect to the unlicensed frequency band is determined according to the channel occupancy time indication information.

In step S3, in responding to the first occupancy duration and the second occupancy duration being different from each other and overlapping with each other, a duration for the base station to occupy the unlicensed frequency band is determined according to the second occupancy duration.

In an embodiment, when the base station is to occupy the unlicensed frequency band, the base station can detect the licensed frequency band, for example, by a way of LBT (listen before talk), to determine whether the unlicensed frequency band is idle. In a case where the unlicensed frequency band is idle, the base station can occupy the unlicensed frequency band to communicate with the terminal.

FIG. 2 is a schematic diagram illustrating a base station occupying an unlicensed frequency band according to an embodiment of the disclosure.

In an embodiment, when the base station is to occupy the unlicensed frequency band, the base station can perform LBT on the unlicensed frequency band. When the LBT is successful, it can be determined that the unlicensed frequency band is idle (for example, the unlicensed frequency band is not occupied), and then the base station starts to occupy the unlicensed frequency band. A total occupancy duration from the beginning of occupying the unlicensed frequency band to the end of occupying the unlicensed frequency band is maximum COT (channel occupancy time) (referred to as MCOT).

After finishing occupying the unlicensed frequency band, when the unlicensed frequency band is to be occupied again, LBT may be performed on the unlicensed frequency band again. When the LBT fails, it can be determined that the unlicensed frequency band is not idle (for example, the unlicensed frequency band is occupied). Then LBT may be performed on the unlicensed frequency band after waiting for a period of time. If the LBT is successful, it can be determined that the unlicensed frequency band is idle, and it begins to occupy the unlicensed frequency band.

FIG. 3 is a schematic diagram illustrating a first occupancy duration and a second occupancy duration according to an embodiment of the disclosure.

In a process of occupying the unlicensed frequency band, the base station can send public control information to the terminal (specifically, the public control information can be sent to the terminals belonging to a group separately, and each terminal in the group can receive the public control information). The time domain unit can be a time slot or a frame, which can be set as required. The present embodiment will be exemplarily described below in a case where the time domain unit is a time slot, and the time domain unit format indication information is a slot format indicator (i.e., SFI).

SFI can indicate a time slot format after the terminal receives the SFI. The time slot format may include three types, the first one is UL, which means that the time slot is a time slot for uplink transmission, and the second one is DL, which means that the time slot is a time slot for downlink transmission, the third one is F, which means that the time slot is a time slot with a flexible format.

According to the SFI, the terminal can determine a time slot whose format is indicated, and a duration corresponding to all the time slots whose formats are indicated in the time domain range is the first occupancy duration. The terminal can directly determine the second occupancy duration according to the occupancy duration indication information.

The first occupancy duration and the second occupancy duration determined by the terminal may be different. For example, as shown in FIG. 3, when the first occupancy duration and the second occupancy duration overlap, the first occupancy duration may be greater than the second occupancy duration, or the second occupancy duration is greater than the first occupancy duration. Start time points of the first occupancy duration and the second occupancy duration may be the same. For example, the start time point is the moment when the public control information is received. Both the first occupancy duration and the second occupancy duration are less than or equal to the maximum COT.

According to an embodiment of the present disclosure, in the case where the first occupancy duration and the second occupancy duration are different and overlap, the second occupancy duration can be used as a criterion to determine the duration for the base station to occupy the unlicensed frequency band, so that the terminal can determine the occupancy duration for the base station to occupy the unlicensed frequency band as soon as possible, so as to perform subsequent operations according to the determined occupancy duration.

Moreover, the time domain unit format indication information can indicate the formats of the time domain units. However, the base station may have completed the communication with the terminal on a time domain unit whose format is indicated, then the occupation on the unlicensed frequency band is ended. Therefore, the accuracy of determining the duration for the base station to occupy the unlicensed frequency band according to the duration corresponding to all the time slots whose formats are indicated in the time domain range is not very high. The occupancy time indication information is generated by the base station according to a required duration of occupying the unlicensed frequency band. Therefore, based on the second occupancy duration, the terminal can accurately determine the duration of occupying the unlicensed frequency band by the base station.

FIG. 4 is a flow chart illustrating a method for determining an occupancy duration according to another embodiment of the disclosure. As illustrated in FIG. 4, the method further includes step S4.

In step S4, in responding to the first occupancy duration greater than the second occupancy duration, within a first difference duration where the first occupancy duration is different from the second occupancy duration, an action is performed in a time domain unit corresponding to a format of a time domain unit indicated by the time domain unit format indication information.

In an embodiment, in the case where the first occupancy duration is greater than the second occupancy duration, for the first difference duration where the first occupancy duration is different from the second occupancy duration, the terminal may determine a format of each time domain unit in the first difference duration according to the time domain unit format indication information. Then, the action can be performed in a corresponding time domain unit according to the indicated format, such as monitoring the unlicensed frequency band, sending information to the base station on the unlicensed frequency band, etc.

Figure 5:
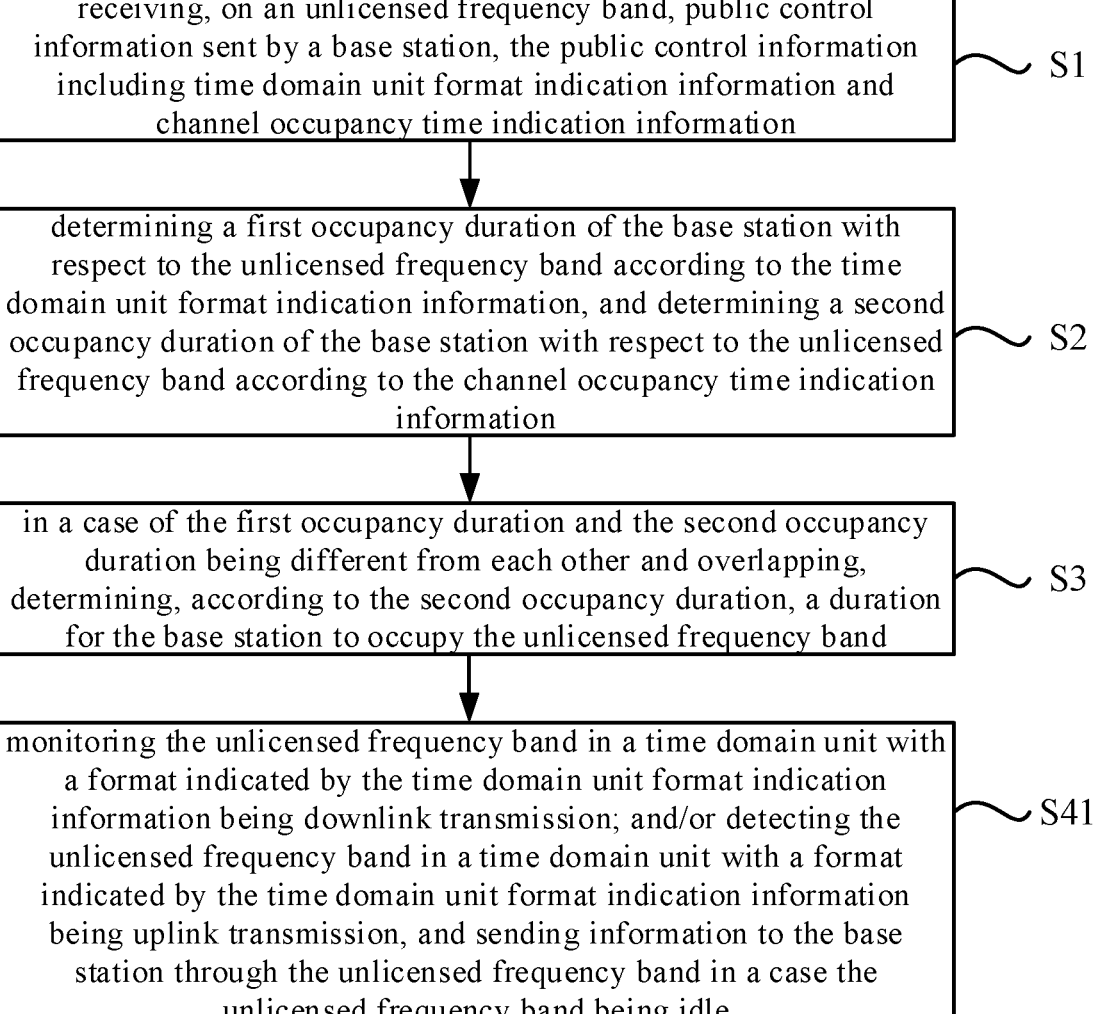
FIG. 5 is a flow chart illustrating a method for determining an occupancy duration according to another embodiment of the disclosure.

FIG. 5 is a flow chart illustrating a method for determining an occupancy duration according to another embodiment of the disclosure. As illustrated in FIG. 5, the step of performing, within the first difference duration where the first occupancy duration is different from the second occupancy duration, the action in the time domain unit corresponding the time domain unit format of the time domain unit indicated by the time domain unit format indication information includes step S41.

In step S41, the unlicensed frequency band is monitored in a time domain unit with a format indicated by the time domain unit format indication information being downlink transmission; and/or the unlicensed frequency band is detected in a time domain unit with a format indicated by the time domain unit format indication information being uplink transmission, and information is sent to the base station through the unlicensed frequency band in a case the unlicensed frequency band being idle.

In an embodiment, the terminal performs actions according to the formats of the time domain units, such as the time domain unit whose format is downlink transmission and the time domain unit whose format is uplink transmission. The base station clarifies specific functions of these two types of time domain units according to the time domain unit format indication information, so the terminal can relatively accurately determine the actions performed by the base station on these two types of time domain units, so that the terminal can perform corresponding actions.

For example, in the time domain unit with the format of the downlink transmission, the base station generally performs downlink transmission and sends information to the terminal through the unlicensed frequency band. Then the terminal can monitor the unlicensed frequency band in the time domain unit with the format of downlink transmission, to determine whether there is information from the base station, so as to quickly obtain the information sent by the base station.

For example, in the time domain unit with the format of the uplink transmission, the base station generally does not perform downlink transmission, so the terminal can try to occupy the unlicensed frequency band in the time domain unit with the format of the uplink transmission. Specifically, the terminal can detect whether the unlicensed frequency band is idle, and can send information to the base station through the unlicensed frequency band when the unlicensed frequency band is idle.

In some examples, detecting the unlicensed frequency band includes followings.

The unlicensed frequency band is detected by using a preset detection mode. A detection period of the preset detection mode is longer than a detection period of a detection mode other than the preset detection mode, and a detection result of the preset detection mode is more accurate than a detection result of the detection mode other than the preset detection mode.

In an embodiment, for the time domain unit within the first difference duration, when the base station indicates a format of the time domain unit according to the time domain unit format indication information, the base station generally does not comprehensively consider a possible occupation on the unlicensed frequency band by other devices. Thus, when the base station stops occupying the unlicensed frequency band within the first difference duration, other devices are more likely to occupy the unlicensed frequency band. Therefore, when the terminal detects the unlicensed frequency band in order to occupy the unlicensed frequency band, the terminal can adopt a relatively strict preset detection mode (such as a cat4 detection method) for detection, so as to ensure accuracy of the detection result, and ensure that the terminal can occupy the unlicensed frequency band in a case where the unlicensed frequency band is idle.

FIG. 6 is a flow chart illustrating a method for determining an occupancy duration according to another embodiment of the disclosure. As illustrated in FIG. 6, the method further includes step S5.

In step S5, in responding to the second occupancy duration greater than the first occupancy duration, within a second time difference where the second occupancy duration is different from the first occupancy duration, the unlicensed frequency band is detected, and information is sent to the based station through the unlicensed frequency band in responding to the unlicensed frequency band being idle.

In an embodiment, in the case where the second occupancy duration is greater than the first occupancy duration, for the second difference duration where the second occupancy duration is different from the first occupancy duration, the base station does not indicate a format of a time domain unit in the second difference duration according to the time domain unit format indication information. Thus, the base station generally does not perform downlink transmission in the time domain unit in the second difference duration. Therefore, the terminal does not need to monitor the unlicensed frequency band during the second difference duration. The terminal may detect the unlicensed frequency band when the terminal is to send information to the base station through the unlicensed frequency band during the second difference duration, and the terminal sends the information to the base station through the unlicensed frequency band in the case where the unlicensed frequency band is idle.

In some examples, detecting the unlicensed frequency band may include the following.

The unlicensed frequency band is detected by using a detection mode other than a preset detection mode. A detection period of the preset detection mode is longer than a detection period of the detection mode other than the preset detection mode, and a detection result of the preset detection mode is more accurate than a detection result of the detection mode other than the preset detection mode.

In an embodiment, for the second difference duration, generally, the base station comprehensively considers a possible occupation on the unlicensed frequency band by other devices when the base station generates the time domain unit format indication information. Thus, within the second difference duration, other devices are unlikely to occupy the unlicensed frequency band when the base station stops occupying the unlicensed frequency band. Then, when the terminal detects the unlicensed frequency band in order to occupy the unlicensed frequency band, the terminal can adopt a detection mode (such as cat2 detection mode) other than the relatively strict preset detection mode (such as cat4 detection method) for detection. The detection period of the detection mode other than the preset detection mode is shorter, thus, it is beneficial to obtain a detection result quickly.

FIG. 7 is a flow chart illustrating a method for determining an occupancy duration according to another embodiment of the disclosure. As illustrated in FIG. 7, determining the first occupancy duration of the base station with respect to the unlicensed frequency band according to the time domain unit format indication information includes steps S21 and S22.

In step S21, an ending time domain unit having a format indicated by the time domain unit format indication information being that the base station stops occupying the unlicensed frequency band is determined.

In step S22, the first occupancy duration is determined according to duration from a beginning time domain unit of the received public control information to the ending time domain unit.

In an embodiment, the terminal may determine time domain units whose formats have been indicated when the terminal determines the first occupancy duration according to the three time slot formats in the above-mentioned embodiments. A duration corresponding to all the time domain units whose formats is indicated in the time domain range is the first occupancy duration. However, in some cases, for multiple sequential time domain units, there may be some time domain units whose formats are not explicitly indicated by the base station. In these time domain units whose formats are not explicitly indicated, the base station does not end the occupation on the unlicensed frequency band, but the terminal may mistakenly consider that the base station ends the occupation on the unlicensed frequency band in these time domain units, because the terminal determines that the formats of these time domain units are not indicated, thus resulting in determining a wrong first occupancy duration.

According to this embodiment, with respect to the formats of the three time slot formats in the above-mentioned embodiments, the base station may add information to the time domain unit format indication information to indicate an additional format. Specifically, the base station may indicate that a format of a time domain unit is end. The format end is used to indicate that the occupation on the unlicensed frequency band by the base station ends in this time domain unit. Thus, the terminal can determine the ending time domain unit having the format indicated by the time domain unit format indication information being that the base station ends occupation of the unlicensed frequency band. Then the terminal determines that the base station ends the occupation of the unlicensed frequency band in the ending time domain unit, so that the first occupancy duration can be determined according to the time from the beginning time domain unit to the ending time domain unit of the received public control information.

It should be noted that in a process of occupying the unlicensed frequency band, the base station can update the time domain unit format indication information as needed after sending the time domain unit format indication information to the terminal, and the base station sends the updated time domain unit format indication information to the terminal in the process of occupying the unlicensed frequency band. That is, the base station can send the time domain unit format indication information to the terminal multiple times within the maximum COT of one process of occupying the unlicensed frequency band.

FIG. 8 is a schematic diagram illustrating a base station sending a plurality of time domain unit format indication information according to an embodiment of the disclosure.

As illustrated in FIG. 8, in one process of occupying the unlicensed frequency band, i.e., within the maximum COT, the base station may first send the public control information x to the terminal, and the terminal may determine the first occupancy duration Tx according to the time domain unit format indication information in the public control information x.

Then, the base station can update the time domain unit format indication information as needed, and can send the updated time domain unit format indication information to the terminal through public control information y. The terminal can determine the first occupancy duration Ty according to the time domain unit format indication information in the public control information y.

For example, an ending position of each first occupancy duration corresponds to an ending position of the maximum COT. A beginning position of each first occupancy duration is a position corresponding to the public control information where the time domain unit format indication information corresponding to the first occupancy duration is located. Thus, the later the public control information is received, the smaller the first occupancy duration determined according to the time domain unit format indication information in the received public control information is.

For example, as illustrated in FIG. 8, the terminal receives the public control information x first, and then receives the public control information y. Thus, a beginning position of a first occupancy duration Tx determined according to the time domain unit format indication information in the public control information x received first corresponds to a position where the public control information x is located, and a beginning position of a first occupancy duration Ty determined according to the time domain unit format indication information in the public control information y received later corresponds to a position where the public control information y is located. Ending position of Tx and Ty are the same, and both correspond to the ending position of the maximum COT. The position of the public control information y is relatively backward, therefore the first occupancy duration Ty is less than the first occupation duration Tx.

FIG. 9 is a flow chart illustrating a method for determining an occupancy duration according to another embodiment of the disclosure. As illustrated in FIG. 9, determining the first occupancy duration of the base station with respect to the unlicensed frequency band according to the time domain unit format indication information includes steps S23 and S24.

In step S23, when a number of time domain unit format indication information received at a plurality of preset time domain positions on the unlicensed frequency band is less than a preset number, target time domain unit format indication information received at a preset time domain position closest to a current moment among the plurality of preset time domain positions is determined.

In step S24, the first occupancy duration of the base station with respect to the unlicensed frequency band is determined according to the target time domain unit format indication information.

In an embodiment, after the base station sends the time domain unit format indication information to the terminal, the base station can update the time domain unit format indication information as needed, and send the updated time domain unit format indication information to the terminal, so that the base station can send multiple pieces of time domain unit format indication information to the terminal. The multiple pieces of time domain unit format indication information may be sent to the terminal at multiple preset time domain positions, and correspondingly, the terminal may receive the multiple time domain unit format indication information at multiple preset time domain positions.

When the number of received time domain unit format indication information is less than the preset number, it can be determined that the base station stops updating the time domain unit format indication information, and then the target time domain unit format indication information received at the preset time domain position closest to the current moment among the plurality of preset time domain positions is determined. The target time domain unit format indication information is closest to the current moment; thus, it is the closest to the base station's configuration of the time domain unit format, and then, the first occupancy duration of the base station with respect to the unlicensed frequency band can be relatively accurately determined according to the target time domain unit format indication information.

FIG. 10 is a flow chart illustrating a method for determining an occupancy duration according to another embodiment of the disclosure. As illustrated in FIG. 10, determining the first occupancy duration of the base station with respect to the unlicensed frequency band according to the time domain unit format indication information includes steps S25 and S26.

In step S25, when time domain unit format indication information is not continuously received on the unlicensed frequency band for a preset period of time, target time domain unit format indication information received closest to a current moment is determined from at least one time domain unit format indication information received.

In step S26, the first occupancy duration of the base station with respect to the unlicensed frequency band is determined according to the target time domain unit format indication information, and the second occupancy duration of the base station with respect to the unlicensed frequency band is determined according to channel occupancy time indication information contained in the target time domain unit format indication information.

In an embodiment, after the base station sends the time domain unit format indication information to the terminal, the base station can update the time domain unit format indication information as needed, and send the updated time domain unit format indication information to the terminal, so that the base station can send multiple pieces of time domain unit format indication information to the terminal.

When the terminal does not continuously receive time domain unit format indication information on the unlicensed frequency band for a preset period of time, it can be determined that the base station stops updating the time domain unit format indication information, and then the target time domain unit format indication information received at the preset time domain position closest to the current moment among the plurality of preset time domain positions is determined. The target time domain unit format indication information is closest to the current moment, thus, it is the closest to the base station's configuration of the time domain unit format, and then, the first occupancy duration of the base station with respect to the unlicensed frequency band can be relatively accurately determined according to the target time domain unit format indication information.

In some examples, the time domain unit format indication information includes at least one of:

a slot format indicator and a frame format indicator.

It should be noted that the above-mentioned embodiments shown in FIG. 7, FIG. 9, and FIG. 10 can also be applied to a case where the public control information contains the time domain unit indication information, but does not contain the occupancy time indication information. In this case, the terminal can accurately determine the first occupancy duration according to the embodiments shown in FIG. 7, FIG. 9 and FIG. 10.

Corresponding to the foregoing embodiments of the method for determining an occupancy duration, the disclosure also provides embodiments of an apparatus for determining an occupancy duration.

FIG. 11 is a block diagram illustrating an apparatus for determining an occupancy duration according to an embodiment of the disclosure. The apparatus for determining an occupancy duration illustrated in embodiments of the disclosure may be suited for a terminal. The terminal includes, but is not limited to, a mobile phone, a tablet computer, a wearable device and the like. The terminal may communicate with a base station. For example, the terminal may communicate with the base station based on 4G protocols, and may also communicate with the base station based on 5G protocols.

As illustrated in FIG. 11, the apparatus for determining an occupancy duration may include an information receiving module 1, a duration determining module 2 and a duration selection module 3.

The information receiving module 1 is configured to receive, on an unlicensed frequency band, public control information sent by a base station. The public control information includes time domain unit format indication information and channel occupancy time indication information.

The duration determining module 2 is configured to determine a first occupancy duration of the base station with respect to the unlicensed frequency band according to the time domain unit format indication information, and determine a second occupancy duration of the base station with respect to the unlicensed frequency band according to the channel occupancy time indication information.

The duration selection module 3 is configured to, in responding to the first occupancy duration and the second occupancy duration being different from each other and overlapping, determine, according to the second occupancy duration, a duration for the base station to occupy the unlicensed frequency band.

Figure 12:
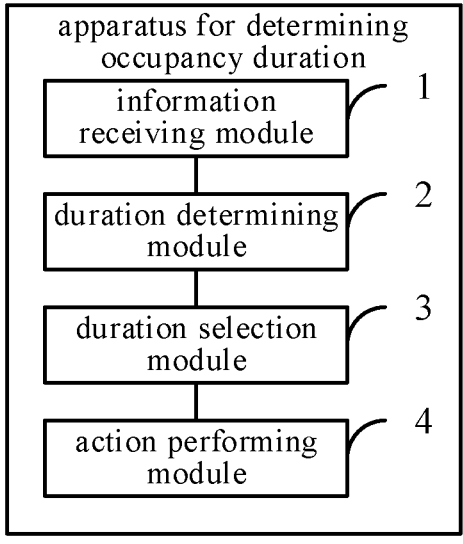
FIG. 12 is a block diagram illustrating an apparatus for determining an occupancy duration according to another embodiment of the disclosure.

FIG. 12 is a block diagram illustrating an apparatus for determining an occupancy duration according to another embodiment of the disclosure. As illustrated in FIG. 12, the apparatus further includes an action performing module 4.

The action performing module 4 is configured to: in responding to the first occupancy duration greater than the second occupancy duration, perform, within a first difference duration where the first occupancy duration is different from the second occupancy duration, an action in a time domain unit corresponding to a format of a time domain unit indicated by the time domain unit format indication information.

In some examples, the action performing module is configured to: monitoring the unlicensed frequency band in a time domain unit with a format indicated by the time domain unit format indication information being downlink transmission; and/or detecting the unlicensed frequency band in a time domain unit with a format indicated by the time domain unit format indication information being uplink transmission, and sending information to the base station through the unlicensed frequency band in a case the unlicensed frequency band being idle.

In some examples, the action performing module is configured to: detecting the unlicensed frequency band by using a preset detection mode. A detection period of the preset detection mode is longer than a detection period of a detection mode other than the preset detection mode, and a detection result of the preset detection mode is more accurate than a detection result of the detection mode other than the preset detection mode.

Figure 13:
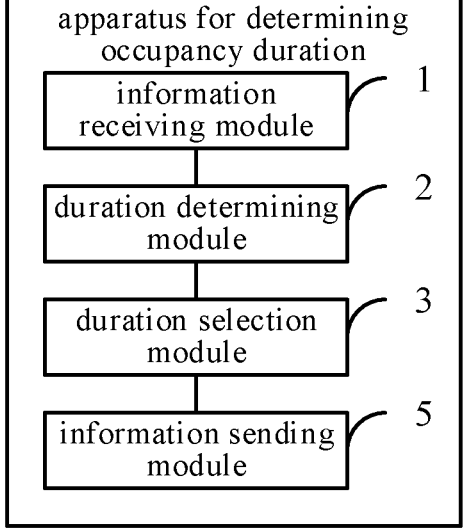
FIG. 13 is a block diagram illustrating an apparatus for determining an occupancy duration according to another embodiment of the disclosure.

FIG. 13 is a block diagram illustrating an apparatus for determining an occupancy duration according to another embodiment of the disclosure. As illustrated in FIG. 13, the apparatus further includes an information sending module 5.

The information sending module 5 is configured to: in responding to the second occupancy duration greater than the first occupancy duration, detecting the unlicensed frequency band is detected within a second time difference where the second occupancy duration is different from the first occupancy duration, and sending information to the based station through the unlicensed frequency band in responding to the unlicensed frequency band being idle.

In some examples, the information sending module is configured to: detecting the unlicensed frequency band by using a detection mode other than a preset detection mode. A detection period of the preset detection mode is longer than a detection period of the detection mode other than the preset detection mode, and a detection result of the preset detection mode is more accurate than a detection result of the detection mode other than the preset detection mode.

In some examples, the duration determining module is configured to: determining a format indicated by the time domain unit format indication information being an ending time domain unit for the base station to stop occupying the unlicensed frequency band; and determining the first occupancy duration according to duration from a beginning time domain unit of the received public control information to the ending time domain unit.

In some examples, the duration determining module is configured to: when a number of time domain unit format indication information received at a plurality of preset time domain positions on the unlicensed frequency band is less than a preset number, determining target time domain unit format indication information received at a preset time domain position closest to a current moment among the plurality of preset time domain positions; and determining the first occupancy duration of the base station with respect to the unlicensed frequency band according to the target time domain unit format indication information.

In some examples, the duration determining module is configured to: when time domain unit format indication information is not continuously received on the unlicensed frequency band for a preset period of time, determining target time domain unit format indication information received closest to a current moment from at least one time domain unit format indication information received; determining the first occupancy duration of the base station with respect to the unlicensed frequency band according to the target time domain unit format indication information.

In some examples, the time domain unit format indication information includes at least one of:

a slot format indicator and a frame format indicator.

Regarding the apparatus in the above-mentioned embodiments, the specific manner in which each module performs operations has been described in detail in the embodiments of the related method, and will not be described in detail here.

As for the apparatus embodiments, since they basically correspond to the method embodiments, reference may be made to the partial descriptions of the method embodiments for relevant parts. The apparatus embodiments described above are only illustrative, in which the modules described as separate components may or may not be physically separated, and the components displayed as modules may or may not be physical modules, that is, they may be located in one place, or they may be distributed over multiple network modules. Some or all of the modules may be selected according to actual needs to achieve the purpose of the solution of this embodiment. Those skilled in the art can understand and implement it without creative effort.

Embodiments of the disclosure further provide an electronic device. The electronic device includes:

a processor; and a memory configured to store instruction executable by the processor.

The processor is configured to implement the method according to any of the above embodiments.

Figure 14:
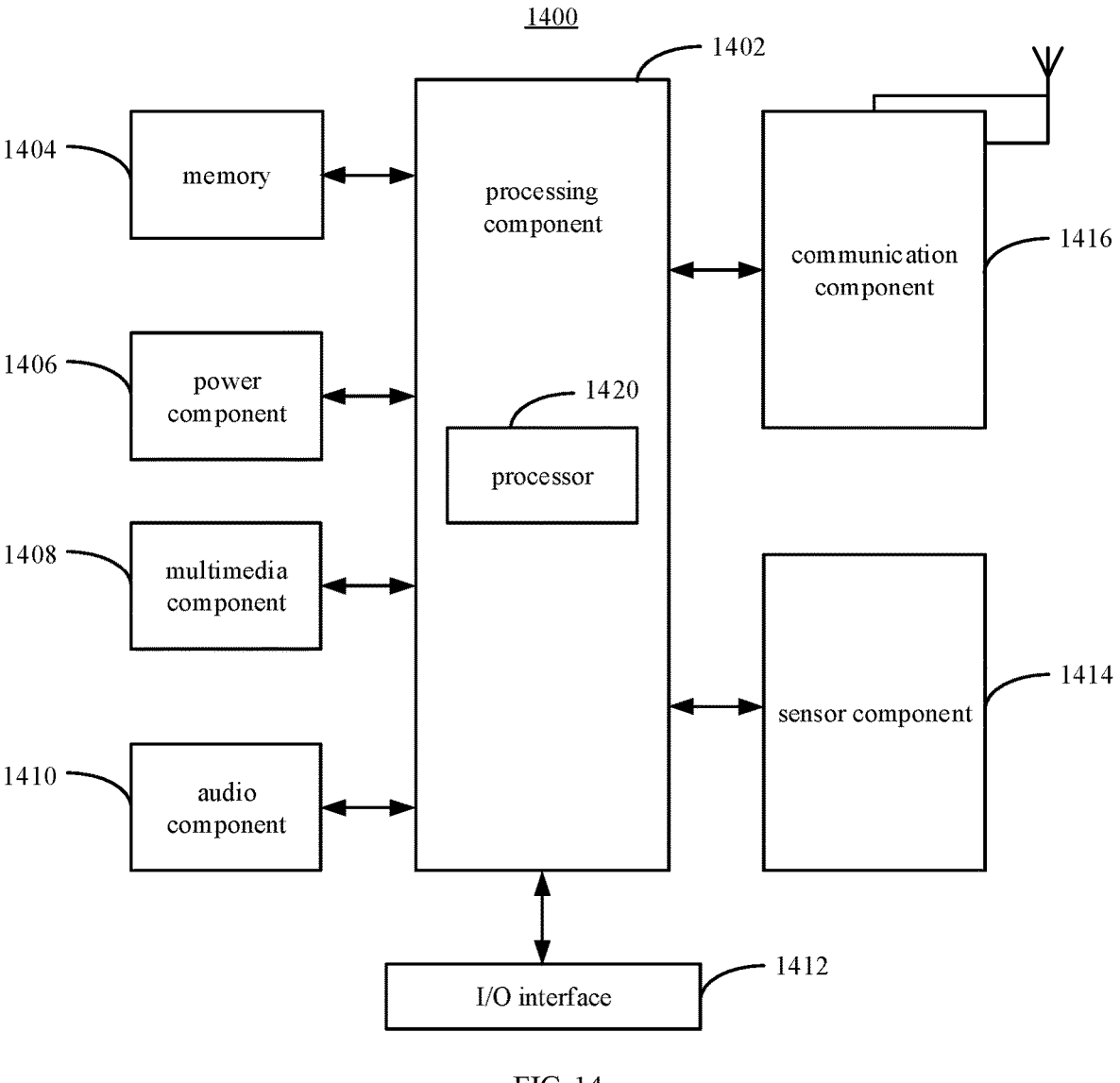
FIG. 14 is a block diagram illustrating an apparatus for determining an occupancy duration according to an embodiment of the disclosure.

FIG. 14 is a block diagram illustrating an apparatus 1400 for determining an occupancy duration according to an embodiment of the disclosure. For example, the apparatus 1400 may be a mobile phone, a computer, a digital broadcast terminal, a messaging device, a gaming console, a tablet, a medical device, exercise equipment, a personal digital assistant, and the like.

As illustrated in FIG. 14, the apparatus 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the apparatus 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the apparatus 1400. Examples of such data include instructions for any applications or methods operated on the apparatus 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EE- PROM), an erasable programmable read-only memory (EPROM), a programmable read-only memory (PROM), a read-only memory (ROM), a magnetic memory, a flash memory, a magnetic or optical disk.

The power component 1406 provides power to various components of the apparatus 1400. The power component 1406 may include a power management system, one or more power sources, and any other components associated with the generation, management, and distribution of power in the apparatus 1400.

The multimedia component 1408 includes a screen providing an output interface between the apparatus 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and the rear camera may receive an external multimedia datum while the apparatus 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone (MIC) configured to receive an external audio signal when the apparatus 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the apparatus 1400. For instance, the sensor component 1414 may detect an open/closed status of the apparatus 1400, relative positioning of components, e.g., the display and the keypad, of the apparatus 1400, a change in position of the apparatus 1400 or a component of the apparatus 1400, a presence or absence of user contact with the apparatus 1400, an orientation or an acceleration/deceleration of the apparatus 1400, and a change in temperature of the apparatus 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the apparatus 1400 and other devices. The apparatus 1400 can access a wireless network based on a communication standard, such as Wi-Fi, 2G, or 3G, 4G LET, 5G NR or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1404, executable by the processor 1420 in the apparatus 1400, for performing the above-described methods. For example, the non-transitory computer-readable storage medium may be a ROM, a random access memory (SAM), a CD-ROM, a magnetic tape, a floppy disc, an optical data storage device, and the like.

Other implementations of the disclosure will readily occur to those skilled in the art upon consideration of the specification and practice of the disclosure disclosed herein. This disclosure is intended to cover any variations, uses, or adaptations of this disclosure that follow the general principles of this disclosure and include common general knowledge or conventional technical means in the technical field not disclosed by this disclosure. The specification and embodiments are to be regarded as exemplary only, with the true scope and spirit of the disclosure being indicated by the following claims.

It is to be understood that, the disclosure is not limited to the precise structures described above and illustrated in the accompanying drawings, and that various modifications and changes may be made without departing from the scope thereof. The scope of the present disclosure is limited only by the appended claims.

It should be noted that, in this description, relational terms such as first and second, etc. are only used to distinguish one entity or operation from another entity or operation, and do not necessarily require or imply any such actual relationship or sequence between these entities or operations. The terms "comprising", "containing" or any other variation thereof are intended to encompass non-exclusive inclusion such that a process, method, article or apparatus comprising a list of elements includes not only those elements, but also other not expressly listed elements, or also include elements inherent to such a process, method, article or apparatus. Without further limitation, an element qualified by the phrase "comprising a . . . " does not preclude the presence of additional identical elements in a process, method, article or apparatus that includes the element.

The methods and apparatus provided by the embodiments of the disclosure are described in detail above, and specific examples are used herein to illustrate the principles and implementations of the disclosure. The descriptions of the above embodiments are only used to help understand the method of the disclosure and its core idea; at the same time, for those skilled in the art, according to the idea of the disclosure, there will be changes in the specific implementation and application scope. In summary, the content of this specification should not be construed as a limitation of the present disclosure.

What is claimed is:

1. A method for determining an occupancy duration, performed by a terminal, the method comprising:

receiving, on an unlicensed frequency band, public control information sent by a base station, wherein the public control information comprises time domain unit format indication information and channel occupancy time indication information;

determining a first occupancy duration of the base station with respect to the unlicensed frequency band according to the time domain unit format indication information, and determining a second occupancy duration of the base station with respect to the unlicensed frequency band according to the channel occupancy time indication information;

in response to the first occupancy duration and the second occupancy duration being different from each other and overlapping, determining, according to the second occupancy duration, a duration for the base station to occupy the unlicensed frequency band; and in response to the second occupancy duration being greater than the first occupancy duration, detecting, within a second time difference where the second occupancy duration is different from the first occupancy duration, the unlicensed frequency band, and sending information to the based station through the unlicensed frequency band in response to the unlicensed frequency band being idle;

wherein the time domain unit format indication information comprises at least one of: a slot format indicator and a frame format indicator;

wherein determining the first occupancy duration of the base station with respect to the unlicensed frequency band according to the time domain unit format indication information comprises:

determining an ending time domain unit having a format indicated by the time domain unit format indication information being the base station stopping occupying the unlicensed frequency band; and determining the first occupancy duration according to a duration from a beginning time domain unit of the received public control information to the ending time domain unit;

wherein determining the first occupancy duration of the base station with respect to the unlicensed frequency band according to the time domain unit format indication information comprises:

in response to not continuously receiving time domain unit format indication information on the unlicensed frequency band for a preset period of time, determining target time domain unit format indication information received closest to a current moment from at least one time domain unit format indication information received; and determining the first occupancy duration of the base station with respect to the unlicensed frequency band according to the target time domain unit format indication information.

2. The method as claimed in claim 1, further comprising:

in response to the first occupancy duration being greater than the second occupancy duration, performing, within a first difference duration where the first occupancy duration is different from the second occupancy duration, an action in a time domain unit corresponding to a format of a time domain unit indicated by the time domain unit format indication information.

3. The method as claimed in claim 2, wherein performing, within a first difference duration where the first occupancy duration is different from the second occupancy duration, an action in a time domain unit corresponding a time domain unit format of a time domain unit indicated by the time domain unit format indication information, comprises at least one of:

monitoring the unlicensed frequency band in a time domain unit with a format indicated by the time domain unit format indication information being downlink transmission;

or detecting the unlicensed frequency band in a time domain unit with a format indicated by the time domain unit format indication information being uplink transmission, and sending information to the base station through the unlicensed frequency band in a case the unlicensed frequency band being idle.

4. The method as claimed in claim 3, wherein detecting the unlicensed frequency band comprises:

detecting the unlicensed frequency band by using a preset detection mode, wherein a detection period of the preset detection mode is longer than a detection period of a detection mode other than the preset detection mode, and a detection result of the preset detection mode is more accurate than a detection result of the detection mode other than the preset detection mode.

5. The method as claimed in claim 1, wherein detecting the unlicensed frequency band comprises:

detecting the unlicensed frequency band by using a detection mode other than a preset detection mode, wherein a detection period of the preset detection mode is longer than a detection period of the detection mode other than the preset detection mode, and a detection result of the preset detection mode is more accurate than a detection result of the detection mode other than the preset detection mode.

6. The method as claimed in claim 1, wherein determining the first occupancy duration of the base station with respect to the unlicensed frequency band according to the time domain unit format indication information comprises:

in response to a number of time domain unit format indication information received at a plurality of preset time domain positions on the unlicensed frequency band less than a preset number, determining target time domain unit format indication information received at a preset time domain position closest to a current moment among the plurality of preset time domain positions; and determining the first occupancy duration of the base station with respect to the unlicensed frequency band according to the target time domain unit format indication information.

7. An electronic device, comprising:

a processor; and a memory configured to store instruction executable by the processor;

wherein the processor is configured to implement a method for determining an occupancy duration, the method comprising:

receiving, on an unlicensed frequency band, public control information sent by a base station, wherein the public control information comprises time domain unit format indication information and channel occupancy time indication information;

determining a first occupancy duration of the base station with respect to the unlicensed frequency band according to the time domain unit format indication information, and determining a second occupancy duration of the base station with respect to the unlicensed frequency band according to the channel occupancy time indication information;

in response to the first occupancy duration and the second occupancy duration being different from each other and overlapping, determining, according to the second occupancy duration, a duration for the base station to occupy the unlicensed frequency band; and in response to the second occupancy duration being greater than the first occupancy duration, detecting, within a second time difference where the second occupancy duration is different from the first occupancy duration, the unlicensed frequency band, and sending information to the based station through the unlicensed frequency band in response to the unlicensed frequency band being idle;

wherein the time domain unit format indication information comprises at least one of: a slot format indicator and a frame format indicator;

wherein determining the first occupancy duration of the base station with respect to the unlicensed frequency band according to the time domain unit format indication information comprises:

determining an ending time domain unit having a format indicated by the time domain unit format indication information being the base station stopping occupying the unlicensed frequency band; and determining the first occupancy duration according to a duration from a beginning time domain unit of the received public control information to the ending time domain unit;

wherein determining the first occupancy duration of the base station with respect to the unlicensed frequency band according to the time domain unit format indication information comprises:

in response to not continuously receiving time domain unit format indication information on the unlicensed frequency band for a preset period of time, determining target time domain unit format indication information received closest to a current moment from at least one time domain unit format indication information received; and determining the first occupancy duration of the base station with respect to the unlicensed frequency band according to the target time domain unit format indication information.

8. The electronic device as claimed in claim 7, wherein the method further comprising:

in response to the first occupancy duration greater than the second occupancy duration, performing, within a first difference duration where the first occupancy duration is different from the second occupancy duration, an action in a time domain unit corresponding to a format of a time domain unit indicated by the time domain unit format indication information.

9. The electronic device as claimed in claim 8, wherein performing, within a first difference duration where the first occupancy duration is different from the second occupancy duration, an action in a time domain unit corresponding a time domain unit format of a time domain unit indicated by the time domain unit format indication information, comprises at least one of:

monitoring the unlicensed frequency band in a time domain unit with a format indicated by the time domain unit format indication information being downlink transmission;

or, detecting the unlicensed frequency band in a time domain unit with a format indicated by the time domain unit format indication information being uplink transmission, and sending information to the base station through the unlicensed frequency band in a case the unlicensed frequency band being idle.

10. The electronic device as claimed in claim 9, wherein detecting the unlicensed frequency band comprises:

detecting the unlicensed frequency band by using a preset detection mode, wherein a detection period of the preset detection mode is longer than a detection period of a detection mode other than the preset detection mode, and a detection result of the preset detection mode is more accurate than a detection result of the detection mode other than the preset detection mode.

11. The electronic device as claimed in claim 7, wherein detecting the unlicensed frequency band comprises:

detecting the unlicensed frequency band by using a detection mode other than a preset detection mode, wherein a detection period of the preset detection mode is longer than a detection period of the detection mode other than the preset detection mode, and a detection result of the preset detection mode is more accurate than a detection result of the detection mode other than the preset detection mode.

12. The electronic device as claimed in claim 7, wherein determining the first occupancy duration of the base station with respect to the unlicensed frequency band according to the time domain unit format indication information comprises:

in response to a number of time domain unit format indication information received at a plurality of preset time domain positions on the unlicensed frequency band less than a preset number, determining target time domain unit format indication information received at a preset time domain position closest to a current moment among the plurality of preset time domain positions; and determining the first occupancy duration of the base station with respect to the unlicensed frequency band according to the target time domain unit format indication information.

* * * * *